(12) United States Patent
Sakuma

(10) Patent No.: US 6,233,698 B1
(45) Date of Patent: May 15, 2001

(54) SEMICONDUCTOR MEMORY DEVICE AND SALES PROCESSOR HAVING THE SAME

(75) Inventor: Hideo Sakuma, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/162,014

(22) Filed: Sep. 28, 1998

(30) Foreign Application Priority Data

Sep. 29, 1997 (JP) .................................................... 9-264456

(51) Int. Cl.[7] .............................. H02H 3/05; G06F 17/60; G06F 17/30
(52) U.S. Cl. ..................................... 714/7; 714/35; 707/4; 705/16
(58) Field of Search ............................... 714/5, 35, 7, 13, 714/48, 702; 705/16, 17; 707/4

(56) References Cited

U.S. PATENT DOCUMENTS

| | | | |
|---|---|---|---|
| 4,853,853 | * 8/1989 | Yamamura et al. | 364/405 |
| 5,093,787 | * 3/1992 | Simmons | 364/406 |
| 5,483,048 | * 1/1996 | Kobayshi | 235/380 |
| 5,933,595 | * 8/1999 | Iizuka et al. | 395/183.11 |
| 5,978,475 | * 11/1999 | Schneier et al. | 380/4 |

FOREIGN PATENT DOCUMENTS 05046490  9/1991  (JP) .

* cited by examiner

*Primary Examiner*—Norman Michael Wright
(74) *Attorney, Agent, or Firm*—Dike, Bronstein, Roberts & Cushman, LLP; David G. Conlin

(57) ABSTRACT

An object of the invention is to perform data reading processing both when an error occurs and when no error occurs by using a memory unit using a nonvolatile semiconductor memory for storing sales data of an electronic cash register. A memory area of a nonvolatile semiconductor memory is divided into a first area and a second area. Sales data is successively written into a plurality of data records from the forefront address of the first area. Into a plurality of flag areas, flags representing whether sales data writing was normally performed or not are written. Sales data sets "C" and "E" having writing errors are newly written in two data records successively from the forefront address of the second area. Of all the data records in the first area, the three data records having no writing errors can be successively read out from the forefront address of the first area, so that data reading can be efficiently performed.

8 Claims, 11 Drawing Sheets

WRITING STATE FLAG
1: NORMAL
0: ERROR

ITEM NO.:
1-4, 0 (ALL ITEMS)

FLAG   1: NORMAL
       0: ERROR

ITEM NO.   1: DATE   2: ADJUSTMENT NO.
           3: SALES DATA TAKINGS   4: SALES DATA TAKINGS

SEMICONDUCTOR MEMORY DEVICE AND SALES PROCESSOR HAVING THE SAME

BACKGROUND OF THE INVENTION

1. Field of the Invention

The present invention relates to a semiconductor memory device such as a memory card which is capable of writing data and uses a nonvolatile semiconductor memory, and to a sales processor such as an electronic cash register and a POS (point of sale) terminal having the semiconductor memory device for storing sales data.

2. Description of the Related Art

Electrically writable and nonvolatile EPROMs and flash memories have been conventionally used in semiconductor memory devices such as memory cards. EPROMs and flash memories are nonvolatile semiconductor memories in which stored data is maintained even after power supply is stopped. These memories are widely used because of their comparatively large capacities and high data reading speeds. Once data is normally written in a nonvolatile semiconductor memory, the written data is surely maintained until the data is erased. Erasing the storage contents from a nonvolatile semiconductor memory requires control or a voltage that is different from control or a voltage required in the normal operation state, and the storage contents never change in the normal operation state. Thus, nonvolatile semiconductor memories are highly reliable. For this reason, nonvolatile semiconductor memories have been preferably used for storing sales data of electronic cash registers and POS (point of sale) terminals handling cash. For example, Japanese Unexamined Patent Publication JP-A 5-46490 (1993) discloses to use a memory card device using an electrically erasable and writable EEPROM for storing image data in an electronic still camera apparatus.

Since nonvolatile semiconductor memories surely maintain the data normally written therein, data writing into nonvolatile semiconductor memories is not easy. For this reason, there is a possibility that a writing error occurs in data writing and data writing cannot be performed normally. Whether writing is performed normally or not can be determined by collating the written data with the data to be written. When there is a difference between the data, the difference is detected as an error. In JP-A-5-46490, for an EEPROM having its memory space partitioned into a plurality of pages, the presence or absence of an error is detected for each page, and with a specific page as an error flag area, an error flag representative of the presence or absence of an error in each page is recorded in the error flag area. The data written in an error occurring page is newly written in an alterantive blank page, and the data written in the error occurring page are replaced by address data all representative of an address of the alternative page. When the data is read out, the error occurring page is determined by referring to the error flag area, the address data is read out from the whole of the error occurring page to determine the address of the alternate page by majority, and based on the determined address, the data is read out from the alternative page.

In JP-A-5-46490, since the address of the alternative page corresponding to the error occurring page is determined by majority from a multiplicity of addresses written in the error occurring page, it is necessary for the controller for controlling writing into the semiconductor memory to control writing of the address into the error occurring page after the address of the alternative page is determined. This complicates the function of the controller and increases the writing time at the time of occurrence of an error in accordance with the time necessary for writing the address of the alternative page. Since the possibility is strong that a page of a nonvolatile semiconductor memory in which an error occurs includes a memory cell being prone to result in an error, in order to surely determine the address of the alternative page by majority, it is necessary that the data amount for one page be large and the number of addresses of the alternative page written in the error occurring page be great. Since it is necessary to read a multiplicity of data and determine the address of the alternative page by majority when the address of the alternative page is read in, the data retrieval performed later is difficult and the data reading speed is low.

SUMMARY OF THE INVENTION

An object of the present invention is to provide a semiconductor memory device capable of easily writing and reading data at high speed regardless of whether an error occurs or not, and a sales processor provided with the same.

In a first aspect of the invention, there is provided a semiconductor memory device using a writable nonvolatile semiconductor memory, the semiconductor memory having first and second memory areas each divided into data records on a prescribed byte number basis, and as well a flag area for writing a writing state as a flag, the semiconductor memory device comprising:

writing error detecting means for judging whether data writing is normally carried out or not during writing data;

flag writing means for writing a writing state as a flag in response to a detection result of the writing error detecting means; and writing switching means for successively writing data to be stored into a data record of the first memory area and when the writing error detecting means detects a writing error, newly writing the data into a data record of the second memory area.

According to the first aspect of the invention, since the writing switching means successively writes data to be recorded into the first memory area of the semiconductor memory, data reading processing can be effectively performed, so that the data reading speed can be increased. When the writing error detecting means detects a writing error when the writing switching means writes data into a data record of the first memory area, the flag writing means writes the error into a flag area and the writing switching means newly writes into a data record of the second memory area the data in which the writing error is detected, so that the data to be stored is surely stored.

As described above, according to the first aspect of the invention, since the data written by the writing switching means are successively written into data records of the first memory area, data having no writing error can be effectively read out at high speed. The presence or absence of a writing error can be easily determined by referring to the flag area. Since data having a writing error is written in the second memory area, data can be surely read out by reading out data from data records of the second memory area.

In a second aspect of the invention, the semiconductor memory device further comprises readout switching means for successively reading out data from the data records of the first memory area with reference to the flag area and when a flag representative of a writing error is written, performing switching so that data is read out from the data records of the second memory area.

According to the second aspect of the invention, since the readout switching means successively reads out data from the data records of the first memory area with reference to the flag area, data reading can be performed at high speed when a flag representative of a writing error is not written. When the flag representative of a writing error is written, switching is performed so that data is read out from the data records of the second memory area, so that the data stored in the semiconductor memory can be surely read out. As described above, according to the second aspect of the invention, from the semiconductor memory device, data can be surely read out at high speed. Moreover, the readout switching means may be added to the semiconductor memory device of the second aspect of the invention.

In a third aspect of the invention, the writing switching means performs writing successively from the forefront address of the second memory area when a writing error is detected.

According to the third aspect of the invention, since the data writing into the second memory area performed by the writing switching means when a writing error is detected is successively performed from the forefront address of the second memory area, the data reading efficiency can be improved. That is, since the data written into the second memory area when an error occurs in data writing into the first memory area is successively written from the forefront address of the second memory area, the data reading from the second memory area is efficiently performed at high speed. Moreover, the writing switching means of the semiconductor memory device of the second aspect of the invention may operate as described above.

In a fourth aspect of the invention, the second memory area is provided in an address area succeeding the first memory area, and the writing switching means successively performs writing from the rearmost address of the second memory area when a writing error is detected.

According to the fourth aspect of the invention, the writing switching means successively performs data writing into the second memory area when an error is detected, from the rearmost address of the second memory area. Since the second memory area is provided so as to succeed the first memory area in the semiconductor memory, the first memory area or the second memory area can be enlarged in accordance with the writing error occurrence state, so that the semiconductor memory can be efficiently used. Moreover, the writing switching means of the semiconductor memory device of the second aspect of the invention may operate as described above.

In a fifth aspect of the invention, the flag area is provided in each of the data records, and the flag writing means writes the writing state as a flag into the flag area of the data record in which the data is written, every time the writing switching means performs data writing.

According to the fifth aspect of the invention, since the flag area is provided in each of the data records and the flag writing means writes the writing state as a flag into the flag area in the data record in which the data is written, every time the writing switching means writes data, the flag can also be read out when the data is read out, so that the presence or absence of a writing error can be speedily determined. That is, since a flag area into which a flag is to be written is provided in each data record of the first and the second memory areas, the flag can also be read out when the data is read out from each data area, so that the flag can be speedily and easily referred to. In the semiconductor memory devices of the second to the fourth aspects of the invention, the flag area may be provided in each data record of the first and the second memory areas and the writing switching means may operate as described above.

In a sixth aspect of the invention, in the case where any writing error is detected in writing into the second memory area, the writing switching means performs writing into the next data record.

According to the sixth aspect of the invention, since the data writing into the second memory area performed by the writing switching means when a writing error occurs in data writing into the first memory area is performed into the next data record in the second memory area when a data writing error is detected, data writing is continued until no writing error is detected, so that the data is surely stored. As a result, the data is stored without omission.

That is, since the data writing into the second memory area performed when an error is detected in data writing into the first memory area is continuously performed successively into different data areas until writing is normally performed without any error, the data is surely written into the second memory area. Moreover, in the semiconductor memory devices of the second to the fifth aspects of the invention, the writing switching means may operate as described above.

In a seventh aspect of the invention, there is provided a sales processor comprising a semiconductor memory device, in which the data to be stored therein is sales data and the semiconductor memory is an EPROM or a flash memory.

According to the seventh aspect of the invention, sales data can be stored in the semiconductor memory device having increased writing and reading speeds and the data is surely stored. Since an EPROM or a flash memory is used as the semiconductor memory, no backup battery is necessary. As described above, according to the seventh aspect of the invention, since an EPROM or a flash memory is used as the semiconductor memory, sales data writing and reading can be efficiently performed at high speed. Since an EPROM or a flash memory is used as the semiconductor memory, the semiconductor memory device can be reduced in size and increased in capacity.

In an eight aspect of the invention, the sales processor further comprises available memory area detecting means for detecting the presence or absence of a blank area in the second memory area, and available memory area warning means for providing a warning when the available memory area detecting means detects that there is no blank area left in the second memory area.

According to the eighth aspect of the invention, since a warning is provided by the available memory area warning means when the blank area detecting means detects that there is no blank area left in the second memory area, the operator of the sales processor can be urged to change the semiconductor memory device, and since the data is surely stored into the second memory area until the warning is provided even if a writing error occurs, the operator does not have to worry about errors when storing sales data into the semiconductor memory device. As described above, according to the eighth aspect of the invention, since a warning is provided when there is no blank area left in the second memory area of the semiconductor memory, the operator of the sales processor can easily and properly determine when to change the semiconductor memory device.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
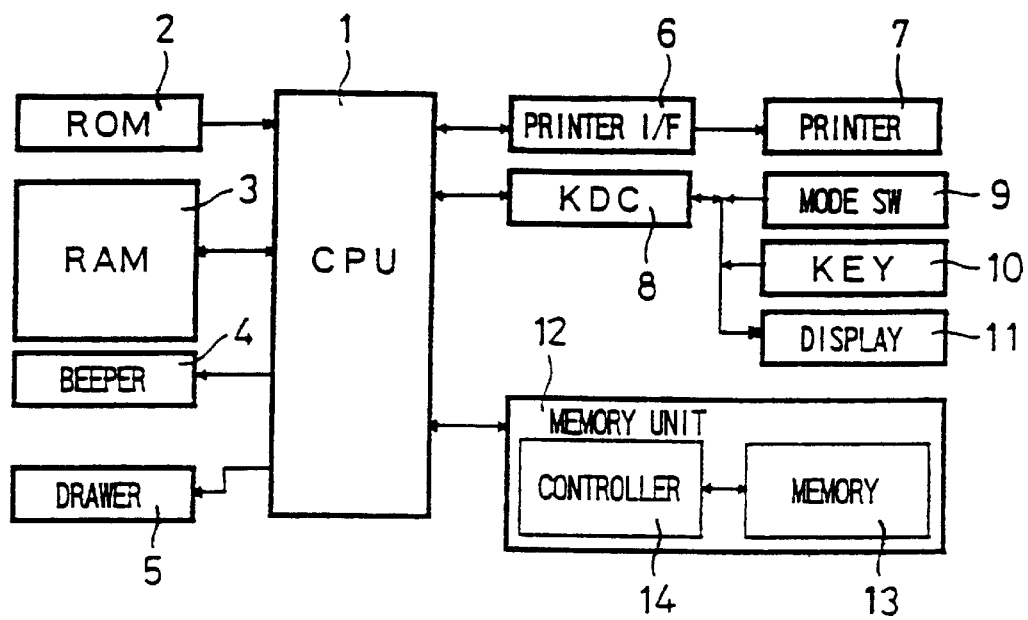
FIG. 1 is a block diagram showing a schematic electrical structure of a sales processor used in embodiments of the present invention.

Now referring to the drawings, preferred embodiments of the invention are described below.

FIG. 1 shows a schematic electrical structure of an electronic cash register as a sales processor used in embodiments of the present invention. Control of the entire electronic cash register is performed by a CPU 1. Microinstructions for the CPU 1 to control peripheral apparatuses, fixed displays and printing message tables are previously stored in a ROM 2. Display buffers, the current operator, manager codes and set data is stored in a RAM 3. Error warnings are generated by a beeper 4. Cash and checks are put in a drawer 5. A printer I/F 6 is an interface circuit between a printer 7 and the CPU 1, and includes a printer controller, a printer driver and a timing signal generating circuit. The printer 7 prints transaction data, inspection data or adjustment result data onto receipt or journal sheets. A KDC (key display controller) 8 controls a mode SW (mode switch) 9, a KEY (keyboard) 10 and a display 11. The mode SW 9 is used for selecting an operation mode from among, for example, a registration mode, a setting mode, an inspection mode and an adjustment mode. Data for registration and setting are input from the KEY 10. Displaying input data, errors and operation guides is carried out on the display 11.

A memory unit 12 which is a memory device is provided for storing sales data of the electronic cash register. The memory unit 12 includes a memory 13 which is a writable nonvolatile semiconductor memory using an EPROM or a flash memory, and a controller 14 for controlling writing and reading of the memory 13. The memory unit 12 is formed, for example, as an IC card and is detachably attachable to the electronic cash register. By detaching the memory unit 12 having sales data stored therein from the electronic cash register and attaching the memory unit 12 to another apparatus such as a host computer, the sales data can be processed.

Figure 2:
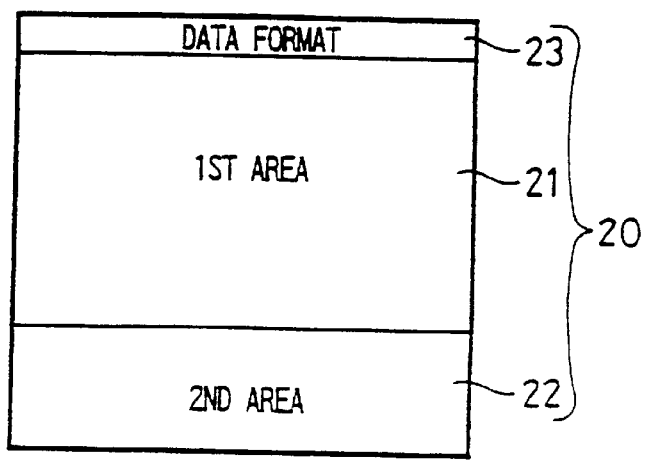
FIG. 2 is a view showing a memory area structure of a memory 13 in a memory unit 12 in a sales processor.

FIG. 2 shows a memory area structure for storing sales data in the memory 13 of FIG. 1. In a memory area 20 of the memory 13, a first area 21 and a second area 22 are provided. Sales data transmitted from the CPU 1 are first written into the first area 21, and when a writing error occurs in the first writing, sales data the same as the sales data in which the error occurs are written into the second area 22 instead. Data on the totaled-up sales of the day are automatically written in a prescribed byte number every adjustment processing performed daily. The first area 21 is preceded by a block in which the prescribed byte number representative of the size of a data record of each item written in the first and the second areas is written as a data format 23. This block is written when the memory unit 12 is attached to the electronic cash register for the first time, and is used for data format collation when sales data is written.

Figure 3:
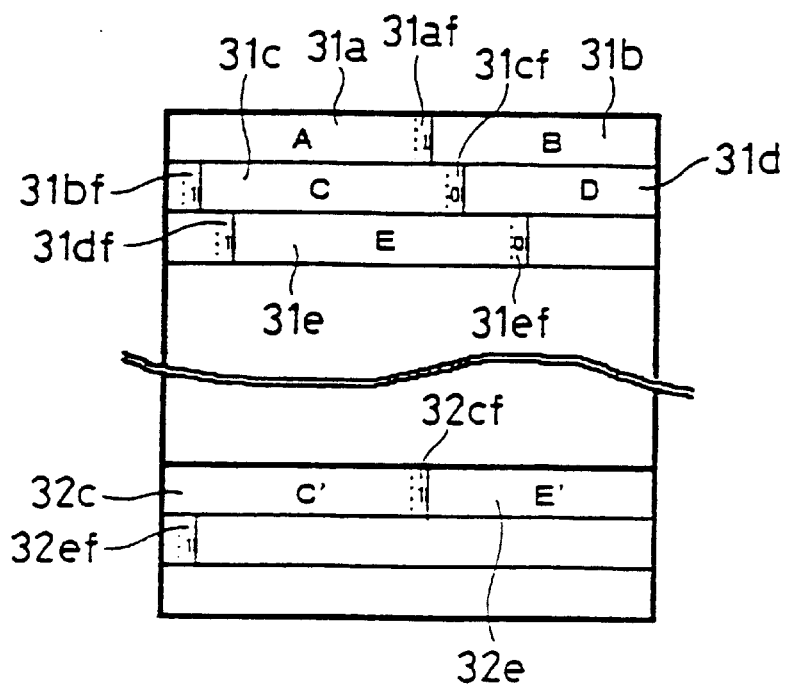
FIG. 3 is a view showing a memory use state in a first embodiment of the invention

FIG. 3 shows as a first embodiment of the invention a writing state of a case where the start address where data writing into the second area 22 into which data is written instead when a writing error occurs in writing into the first area 21 is started is the forefront address of the second area 22. A sales data set "A" written in the first adjustment processing is written into a data record 31a. A writing flag "1" representing that writing was normally performed in writing of the sales data set "A" is written into a flag area 31af provided in the data record 31a. Then, a sales data set "B" written in the second adjustment processing is written into the next data record 31b. The writing flag "1" representing that writing was normally performed in writing of the sales data set "B" is written into a flag area 31bf provided in the data record 31b. Then, the sales data sets "C", "D" and "E" are written into data records 31c, 31d and 31e in the subsequent adjustment processings. The writing flags are respectively written into flag areas 31cf, 31df and 31ef.

In FIG. 3, writing error occurrence in writing of the sales data sets "C" and "E" is represented by the writing flags "0" written in the flag areas 31cf and 31ef. Since the alternative area used when writing was not normally performed in writing of the sales data set "C" starts at the start address of the second area 22, the data set is written into a data record 32c. Into a flag area 32cf provided in the data record 32c, the writing flag "1" representing that writing was normally performed is written. Likewise, into a data record 32e of the second area 22 succeeding the data record 32c of the sales data set "C" and used as the alternative area used when writing was not normally performed in writing of the sales data set "E", the sales data set "E" is written, and the writing flag "1" representing that writing was normally performed is written into a flag area 32ef. In FIG. 3, the data set written in the second area 22 are marked with "'" so as to be distinguished from the data set in the first area 21 into which the data sets are written first.

Figure 4:
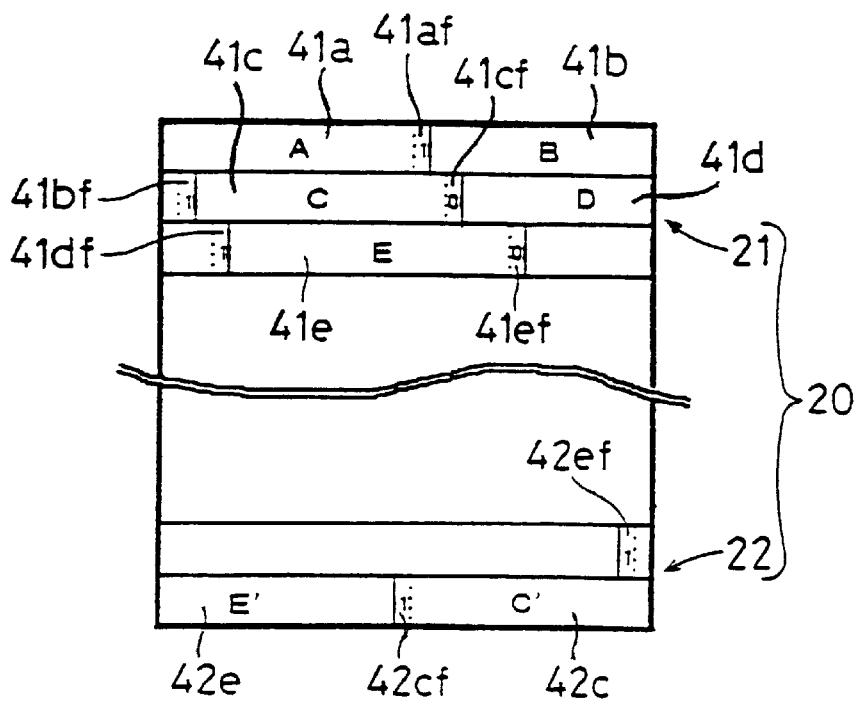
FIG. 4 is a view showing a memory use state in a second embodiment of the invention.

FIG. 4 shows as a second embodiment of the invention a writing state in the case where the start address where when any error occurs in writing into the first area 21 of the memory area 20 of FIG. 2, data writing is executed into the second area 22 instead of the first area 21 is the rearmost address. A sales data set "A" written in the first adjustment processing is written into a data record 41a. The writing flag "1" representing that writing was normally performed in writing of the sales data set "A" is written into a flag area 41af provided in the data record 41a. Then, a sales data set "B" written in the second adjustment processing is written into a data record 41b and the writing flag representing that writing was normally performed is written into a flag area 41bf. Then, sales data sets "C", "D" and "E" are written into data records 41c, 41d and 41e in the subsequent adjustment processings and the writing flags are respectively written into flag areas 41cf, 41df and 41ef. In this embodiment, writing errors occurred when the sales data sets "C" and "E" were written, so that the writing flags "0" are written in the flag areas 41cf and 41ef.

The alternative area used when writing was not normally performed in writing of the sales data set "C" is the data record 42c at the rearmost address of the second area 22, and the sales data set "C" is written into the data record 42c. Into a flag area 42cf provided in the data record 42c, the writing flag "1" representing that writing of the sales data set "C" was normally performed is written. Likewise, into a data record 42e succeeding the data record 42c of the second area and used instead when writing was not normally performed in writing of the sales data set "E", the sales data set "E" is written, and the flag "1" representing that writing was normally performed is written into a flag area 42ef provided in the data record 42e. In FIG. 4, the data written in the alternative areas are also marked with so as to be distinguished from the data in the first area 21 into which the data is written first.

Thus, by providing the first area 21 and the second area 22 continuously with each other and starting sales data writing at the rearmost address of the second area 22, the memory area 20 can be effectively used without any blank area left in the first area 21 or in the second area 22 when many writing errors occur or hardly any writing errors occur, compared with the case where data writing is started at the fixed start address of the second area 22 as shown in FIG. 3. In this embodiment, in order to prevent the memory unit 12 from being changed when there is still a blank area left therein, the boundary of the first area 21 and the second area 22 shown in FIG. 2 is determined when all the areas of the first area 21 or the second area 22 are filled, so that the memory area is effectively used without any blank area left. Consequently, the memory area sandwiched between the memory area into which data is first written and the memory area into which data is written when a writing error occurs in the first writing can be used as a common memory area.

Figure 5:
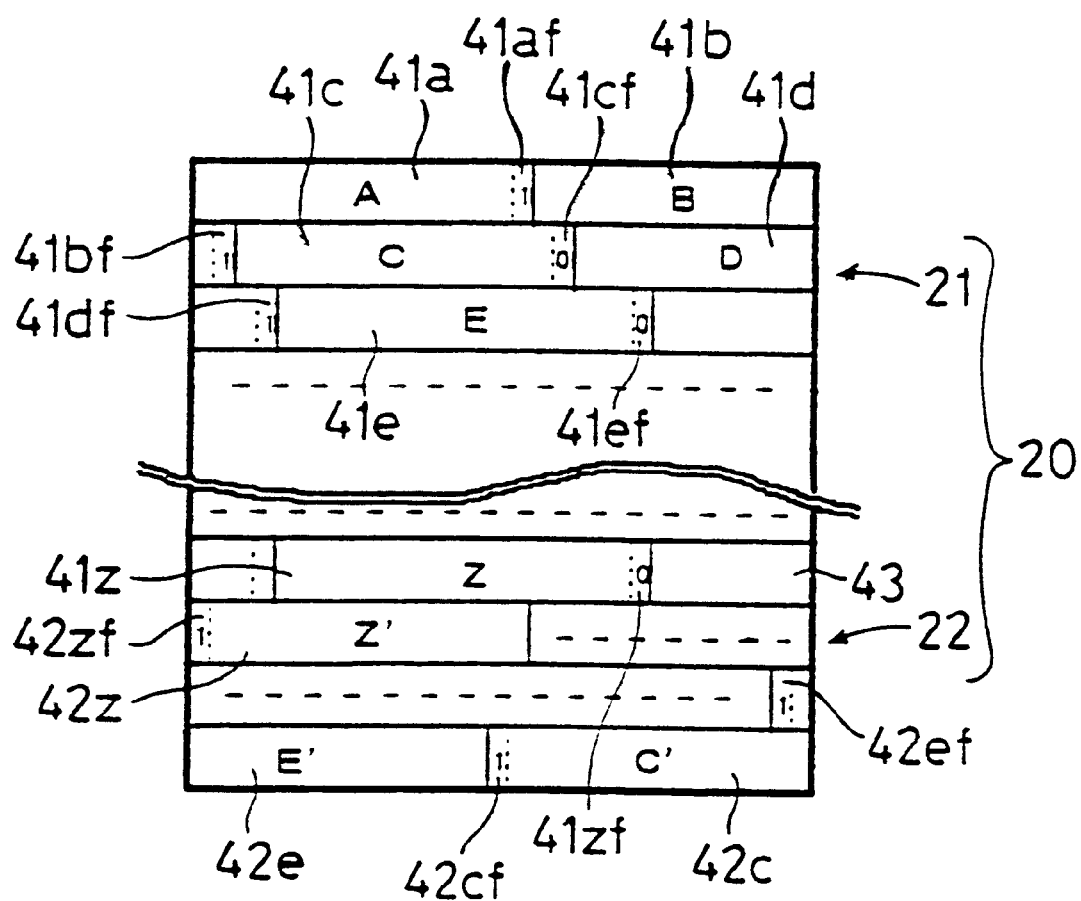
FIG. 5 is a view showing a memory use state in a third embodiment of the invention.

FIG. 5 shows as a third embodiment of the invention a memory writing state of a case where writing is started at the rearmost address of the second area 22 like in the embodiment shown in FIG. 4 and means is provided for detecting the capacity of the remaining memory area. For convenience of explanation, in FIG. 5, sales data is written continuously with the memory use state of FIG. 4. The successive writing of sales data is continued and when sales data set "Z" is written into a data record 41z, writing is not normally performed. Therefore, the sales data set "Z" is written into a data record 42z at the rearmost address being available in the second area 22 serving as the alternative area, and the writing flag "1" representing that writing was normally performed is written into a flag area 42zf provided in the data record 42z. When it is determined that the remaining memory area 43 cannot hold the byte number prescribed as the data record for writing the sales data of one processing, a warning as described later is provided. Moreover, an arrangement can be employed in which by previously performing setting, a warning is provided when the number of times writing can be performed is smaller than a preset number, for example, when the remaining number of times is 100 or smaller.

FIG. 6 shows data formats used in the embodiments of the invention. FIG. 6A shows the storage contents of the area of the data format 23 of FIG. 2 in the memory area of the memory 13. FIG. 6B shows writing data supplied from the CPU 1 to the memory unit 12. FIG. 6C shows writing result data supplied from the memory unit 12 of FIG. 1 to the CPU 1 in response to data writing. FIG. 6D shows retrieval instruction data supplied from the CPU 1 to the memory unit 12 and retrieval data supplied from the memory unit 12 to the CPU 1.

Figure 6A:
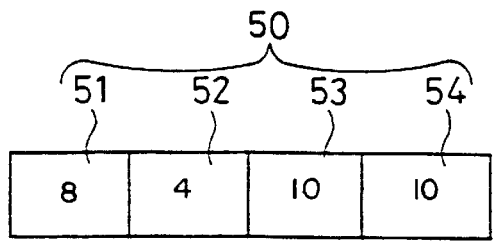
FIGS. 6A through 6D are views showing the storage contents of a part of the memory area 13 of FIG. 2, the contents of sales data written in the memory unit 12 of FIG. 1, the contents of writing result data supplied from the memory unit 12 to a CPU 1 in response to sales data writing, and data formats transferred between the CPU 1 and the memory unit 12.
Figure 6B:
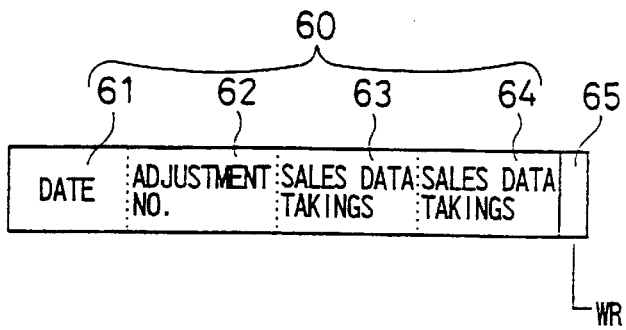

The data format of FIG. 6A shows the allocation format of the prescribed byte number of the sales data written in the memory unit 12 shown in FIG. 6B. When the apparatus is installed as a sales processor, the allocation format is transmitted from the CPU 1 to the memory unit 12 and written into the area of the data format 23 of the memory 13. The data include the prescribed byte number 50 of each item. In the case of FIG. 6A, four items 51, 52, 53 and 54 comprise blocks of 8 bytes, 4 bytes, 10 bytes and 10 bytes, respectively. The data also include the number of writing start adjustments and the sales data writing start addresses. After written as the data format 23, the data is used in data format collation performed when sales data is written, and in sales data retrieval.

FIG. 6B shows actual data formats as sales data 60. The first eight bytes constitute date data 61. The next four bytes constitute adjustment number data 62 also referred to adjustment NO. The next ten bytes constitute sales data takings 63 and the next ten bytes, sales data takings 64. A writing state flag 65 representative of a writing result is added to the last. As the writing state flag 65, "1" is written when the sales data 60 is normally written and "0" is written when a writing error occurs.

Figure 6C:
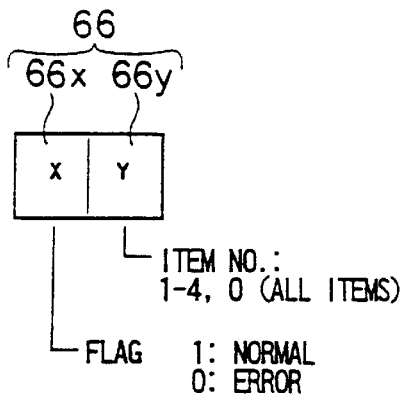
Figure 6D:
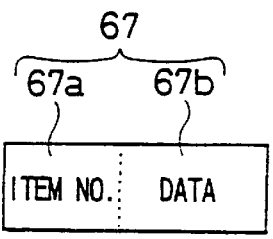

The writing result is supplied from the memory unit 12 also to the CPU 1 as writing result data 66 of the format shown in FIG. 6C. The writing result data 66 includes a flag 66x and an item No. 66y. The writing state flag 65 of FIG. 6B is also reflected in the flag 66x. The item No. 66y also corresponds to an item No. 67a of item data 67 of the format of FIG. 6D. The item data 67 includes as data 67b the data of an item specified by the item No. 67a, and is transferred between the CPU 1 and the memory unit 12.

In this embodiment, since the cost is reduced by lowering the function of the controller 14 used in the memory unit 12 of FIG. 1, the data of each item is separately transferred. By using a controller 14 with a higher function, the data of all the items can be transferred at a time.

Figure 7:
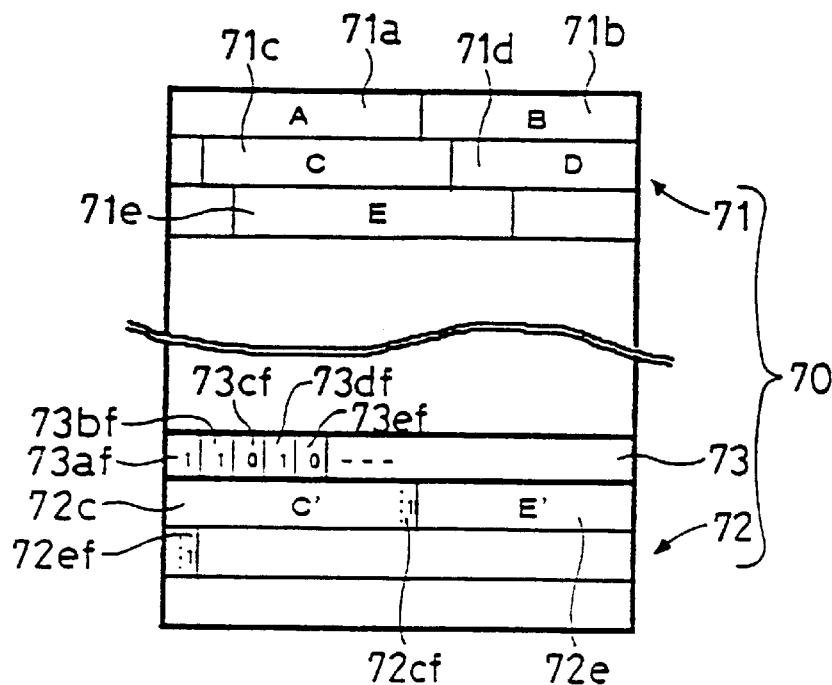
FIG. 7 is a view showing a memory use state in a fourth embodiment of the invention.

FIG. 7 shows a use state of a memory area 70 as a fourth embodiment of the invention. In the memory area 70, an error flag area 73 for a first area 71 is independently provided between the first area 71 and a second area 72. Into the second area 72 serving as the alternative area, writing is successively performed from the forefront address like in the embodiment of FIG. 3, and a flag area is provided for each data record. In the first area 71, sales data set "A" of the first adjustment processing is written into a data record 71a and then, sales data sets "B", "C", "D" and "E" of the second and succeeding adjustment processings are successively written into data records 71b, 71c, 71d and 71e. The writing states are successively written into flag areas 73af, 73bf, 73cf, 73df and 73ef of the error flag area 73 when the corresponding sales data is written into the first area 71. In writing of the sales data sets "C" and "E", the flag "0" is written in the corresponding flag areas 73cf and 73ef, which shows that writing was not normally performed. For this reason, sales data sets "C'" and "E'" are written at each time of adjustment thereof into data records 72c and 72e from the forefront address of the second area 72 serving as the alternative area, and the flag "1" representing that writing was normally performed is written into flag areas 72cf and 72ef added to the data records 72c and 72e. The sales data written in the second area 72 serving as the alternative area is marked with "'" so as to be distinguished from the sales data written in the first area 71 into which the data is written first.

Figure 8:
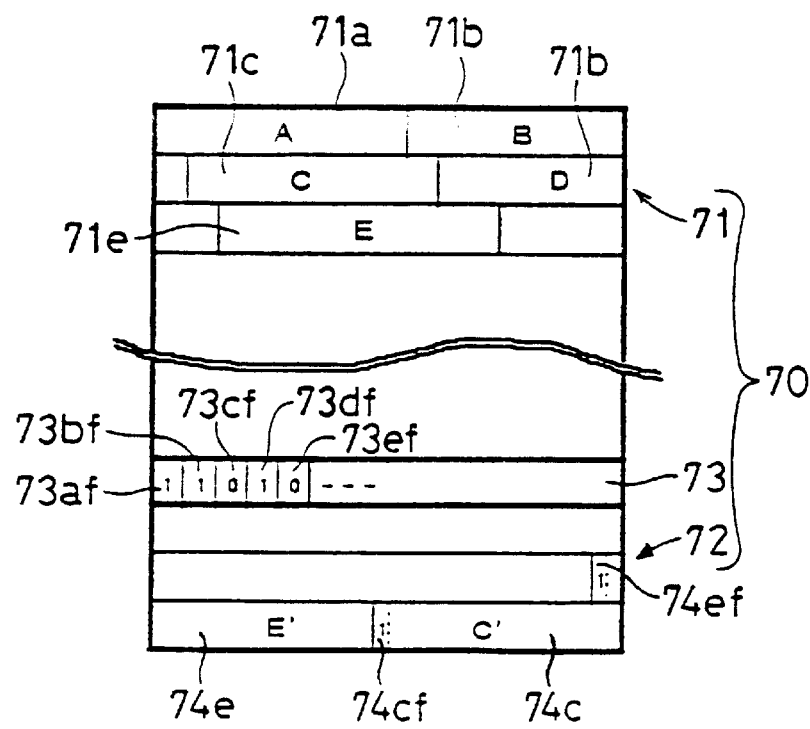
FIG. 8 is a view showing a memory use state in a fifth embodiment of the invention.

FIG. 8 shows a use state of the memory area 70 as a fifth embodiment of the invention. In the memory area 70, the error flag area 73 for the first area is independently provided between the first area 71 and the second area 72. Into the second area 72 serving as the alternative area, writing is successively performed from the rearmost address like in the embodiment of FIG. 4, and a flag area is provided for each data record. For convenience of explanation, a case is assumed where writing into the first area 71 and the error flag area 73 is performed under the same conditions as in FIG. 7. Since writing errors occur in sales data sets of "C" and "E", sales data sets "C'" and "E'" are written at each time of adjustment thereof into data records 74c and 74e from the rearmost address of the second area 72 serving as the alternative area, and the flag "1" representing that writing was normally performed is written into flag areas 74cf and 74ef added to the data records 74c and 74e. The sales data written in the second area 72 serving as the alternative area is marked with "'" so as to be distinguished from the sales data written in the first area 71 into which the data is written first Thus, by writing the sales data from the rearmost address of the second area 72, the memory area 70 can be effectively used like in the embodiments of FIGS. 4 and 5. That is, the memory area 70 can be effectively used with hardly any blank area left when many writing errors occur or hardly any writing errors occur compared with the case where writing of alternative sales data is performed by using a fixed address such as the start address of the second area 72 as the start address. The memory area sandwiched between the first area 71 into which data is first written and the second area 72 which serves as the alternative area when a writing error occurs in the first writing can be effectively used as a common memory area.

Figure 9:
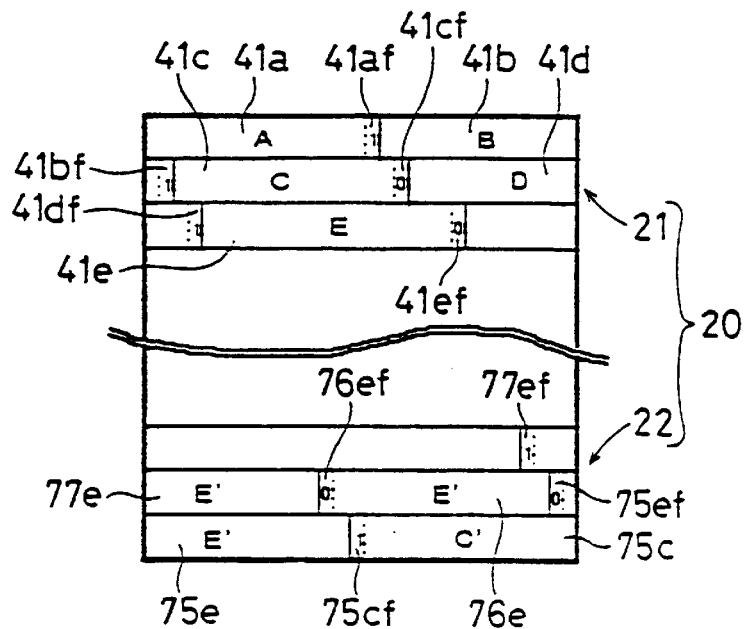
FIG. 9 is a view showing a memory use state in a sixth embodiment of the invention.

FIG. 9 shows as a sixth embodiment of the invention a use state of the memory area 20 similar to the memory area in the embodiment of FIG. 4. Since errors occur in writing of sales data sets "C" and "E" into the first area 21, sales data sets "C'" and "E'" are written at each time of adjustment thereof, and although the flag "1" representing that writing was normally performed is written into a flag area 75cf added to a data record 75c, the flag "0" is written in a flag area 75ef of a data record 75e. For this reason, the sales data set "E'" is also written into the next data record 76e. Writing was not normally performed either at this time and the error flag 76ef is "0". Writing of the sales data set "C'" into the next data record 77e was normally performed and the flag written in the flag area 77ef is also "1". The sales data written in the second area 72 serving as the alternative area is marked with "'" so as to be distinguished from the sales data written in the first area 71 into which the data is written first.

In this embodiment, when a writing error occurs in the first writing and a writing error also occurs in writing of the sales data into the alternative area, writing is continued until writing is normally performed. For this reason, sales data is surely written. Moreover, by writing the sales data from the rearmost address of the second area 22, the memory area 20 can be effectively used like in the embodiments of FIGS. 4 and 5. That is, the memory area 20 can be effectively used with hardly any blank area left when many writing errors occur or hardly any writing errors occur, compared with the case in which writing of alternative sales data is performed by using a fixed address such as the start address of the second area 22 as the start address. The memory area sandwiched between the first area 21 into which data is first written and the second area 22 which serves as the alternative area when a writing error occurs in the first writing can be effectively used as a common memory area. Further, like in FIG. 3, even when the sales data sets "C'" and "E'" are successively written from the forefront address of the alternative area, data writing is surely performed by continuing writing until writing is normally performed.

Figure 10:
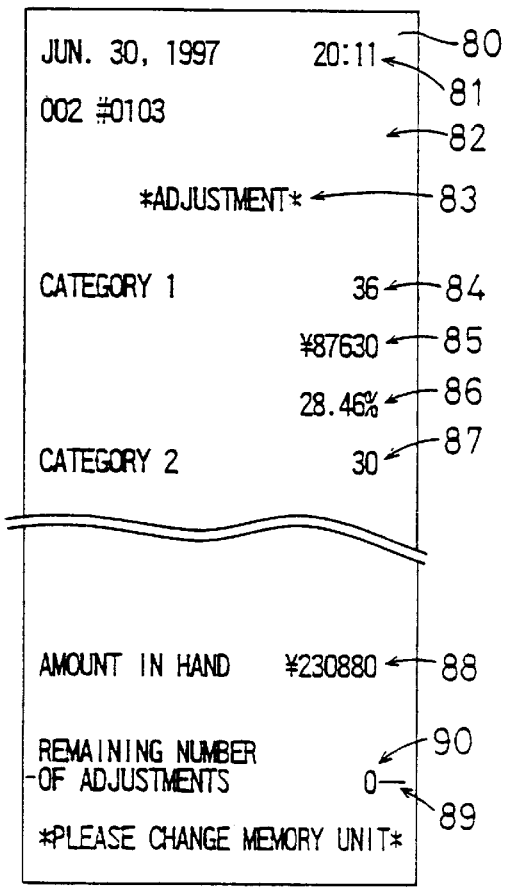
FIG. 10 is a view showing a state in which notification of the change time of the memory unit is printed together with the adjustment processing results in the third embodiment of the invention.

FIG. 10 shows a printing example of a receipt 80 for notification of the change time of the memory unit 12 at the time of adjustment in the embodiment of FIG. 5. In the adjustment processing for totaling up and outputting the day's sales, sales data is written into the memory unit 12 based on the adjustment processing results, and notification of the change time of the memory unit is printed in accordance with the writable space of the memory area 43 at that time. The mode SW 9 of FIG. 1 is switched to an "adjustment" position and an input operation of a [CASH/DEPOSIT/EXCHANGE] key of the KEY 10 is performed to carry out an adjustment processing.

When an adjustment processing is performed, the date and the time of execution of the processing are printed in the first line 81. In the next line 82, the register number and the serial receipt number are printed. In the next line 83, "*ADJUSTMENT*" representative of adjustment processing is printed. In the succeeding lines 84, 85, 86 and 87, the number of sold products, the takings, the ratio of the takings of the products of the category to the total takings, and the number of sold products of the next category are successively printed for each of the preset categories. In a line 88 in which "AMOUNT IN HAND" is printed, the amount of money currently kept in the drawer 5 of the electronic cash register is printed. Thus, the totaling-up report of the adjustment is printed.

Lastly, the sales data totaled up in the adjustment is written into the memory unit 12 and the writable area of the memory 13 is confirmed. The number of times writing can be performed is calculated through computing based on the prescribed byte numbers as shown in FIG. 6A, and the remaining number of adjustments 90 is printed in a line 89 in which "REMAINING NUMBER OF ADJUSTMENTS" is printed. By explicitly notifying the person in charge of the apparatus by performing printing to urge the person to change the memory unit 12 when the prescribed remaining number of adjustments is reached, troubles are prevented from occurring.

Figure 11:
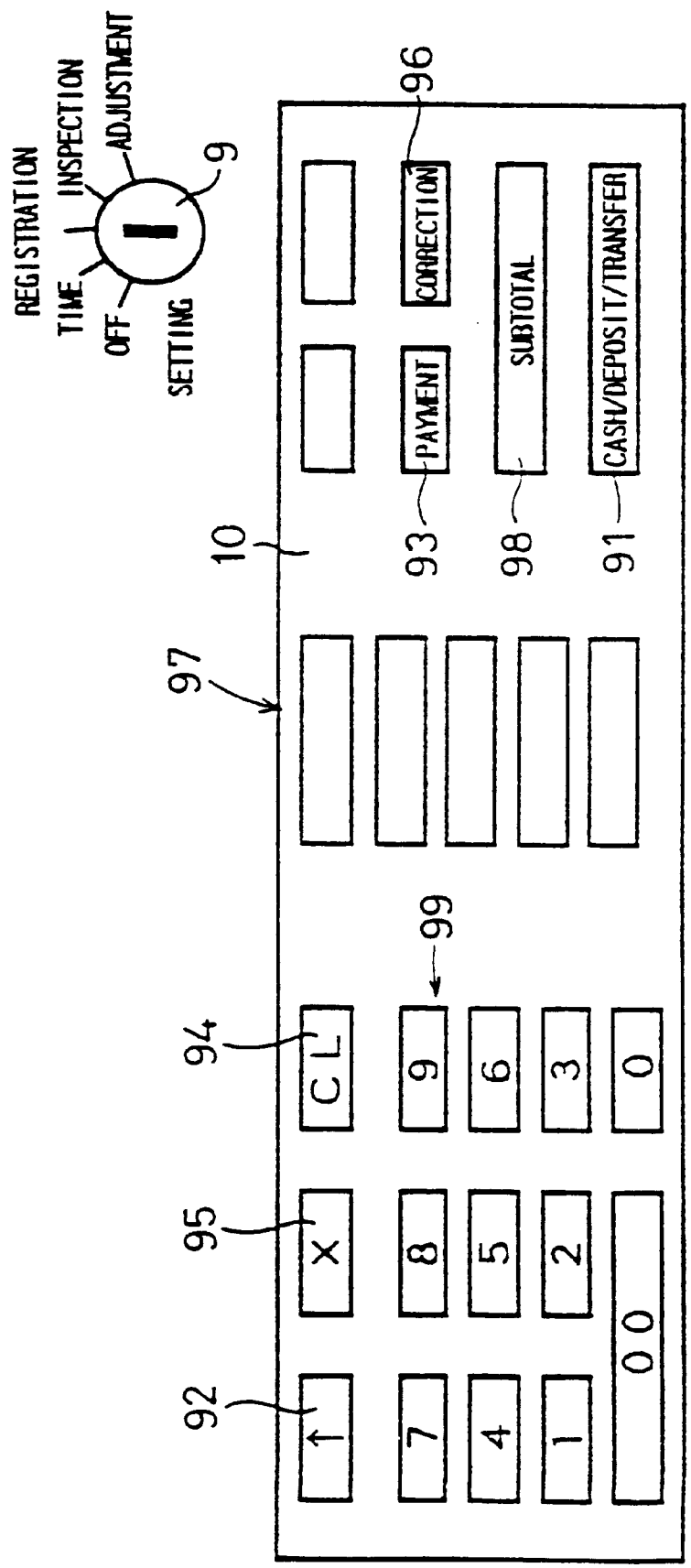
FIG. 11 is a view showing an example of a keyboard KEY 10 in the sales processor of FIG. 1.

FIG. 11 shows an example of the KEY 10 of FIG. 1. The [CASH/DEPOSIT/EXCHANGE] key 91 is operated together with the mode SW 9 to start an adjustment processing as described above, and is used for cash sales, cash deposits and exchange. The mode SW 9 switches among a setting mode, a time display mode, a registration mode, an inspection mode, an adjustment mode and a power OFF state. A paper feed key 92 is used for feeding the roll of paper for receipt printing. A payment key 93 is used when there is a payment other than sales of products. A [CL] key 94 is used when wrong numbers are input by mistake and in order to stop continuous warning beeps. A [×] key 95 is used when two or more of the same products are sold and at the time of setting. A [CORRECTION] key 96 is used to erase erroneous registrations. A [PRODUCT] key 97 is used to register orders/sales of products. A [SUBTOTAL] key 98 is used to calculate and display the subtotal. A numeric keyboard 99 is used to input numbers such as unit prices, the amount of money, the number of products and person-in-charge codes.

Figure 12:
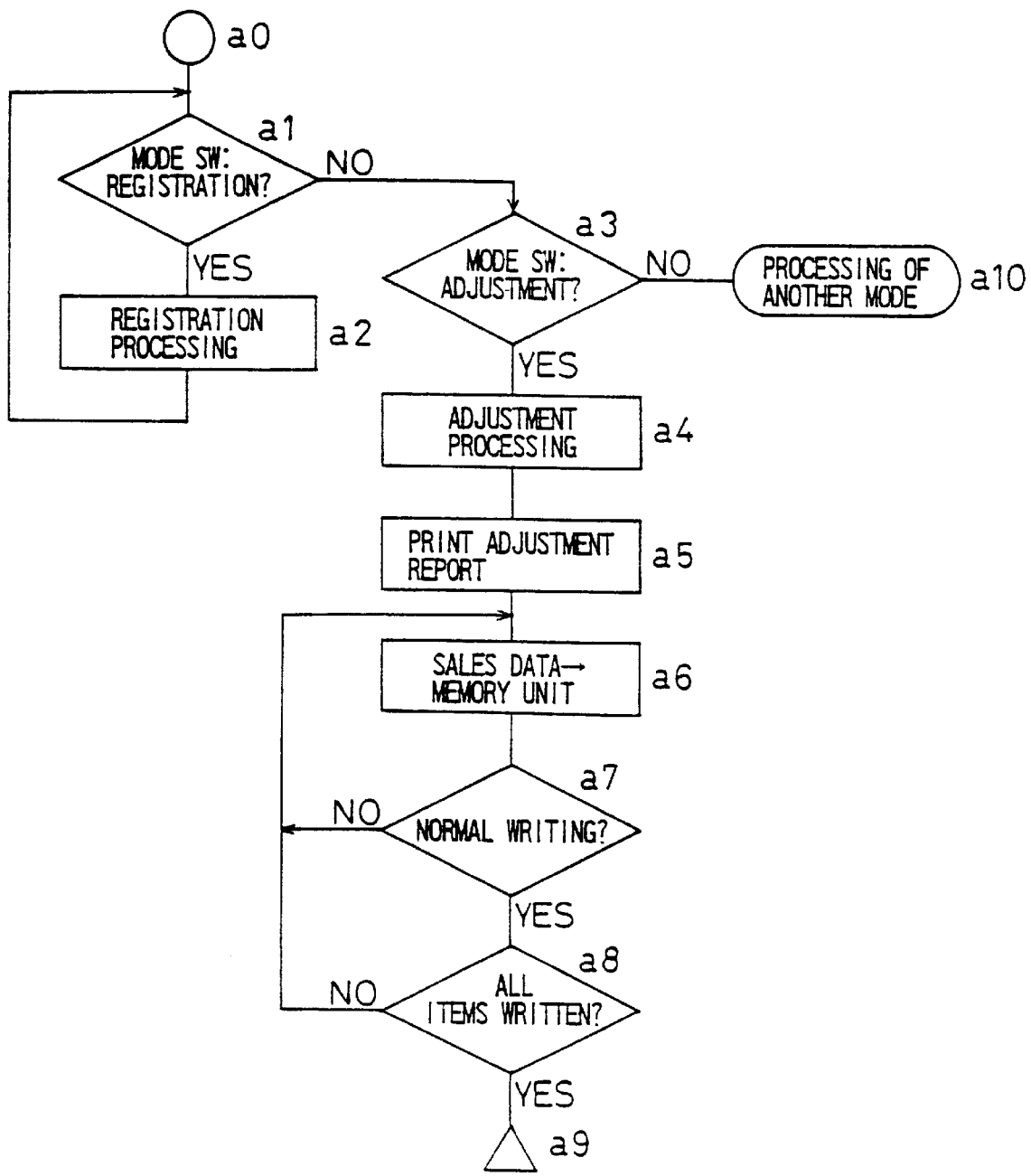
FIG. 12 is a flowchart showing the procedure of a processing performed by the sales processor of FIG. 1.

FIGS. 12 to 15 show the procedures of processings performed by the electronic cash register of FIG. 1. FIG. 12 shows the procedure of a processing in which the state of the mode SW 9 is always checked to switch the operation mode. The electronic cash register has the following operation modes: the setting mode, the time display mode, the registration mode, the inspection mode and the adjustment mode. Switching among these modes is made by operating the mode SW 9. Normally, the electronic cash register is placed in the registration mode for performing sales processing. When the mode SW 9 is switched from the OFF position, processing is started at step a0. When it is confirmed that the mode SW 9 is at the registration mode position at step a1, the process proceeds to the registration processing at step a2. When the processing is completed, the process returns to the state check at step a1.

When the mode SW 9 is not at the registration mode position at step a1, whether the mode SW 9 is at the adjustment mode position or not is determined at step a3. When the mode SW 9 is at the adjustment mode position, an adjustment processing such as a totaling up processing by a predetermined key operation is performed at step a4, and an adjustment report is printed at step a5. At step a6, sales data based on the results of the adjustment processing is transferred to the memory unit 12 in a predetermined data format and writing is performed. Data writing is performed by the controller 14 in accordance with the writing specifications of the memory 13. At the next step a7, whether the sales data is normally written in the memory unit 12 or not is determined based on the data transferred from the memory unit 12. When the sales data is normally written, whether the sales data of all the items has been written or not is determined at step a8. When the sales data is not normally written at step a7, the process returns to step a6 to re-transfer the data. When the sales data of all the items has not been written at step a8, the process returns to step a6 to transfer the sales data of the next item to the memory unit 12. When writing of the sales data of all the items is completed at step a8, the sales data writing into the memory unit 12 and the adjustment processing are finished at step a9. When the mode SW 9 is at the position of another mode at step a3, the processing of the mode is performed at step a10.

Figure 13:
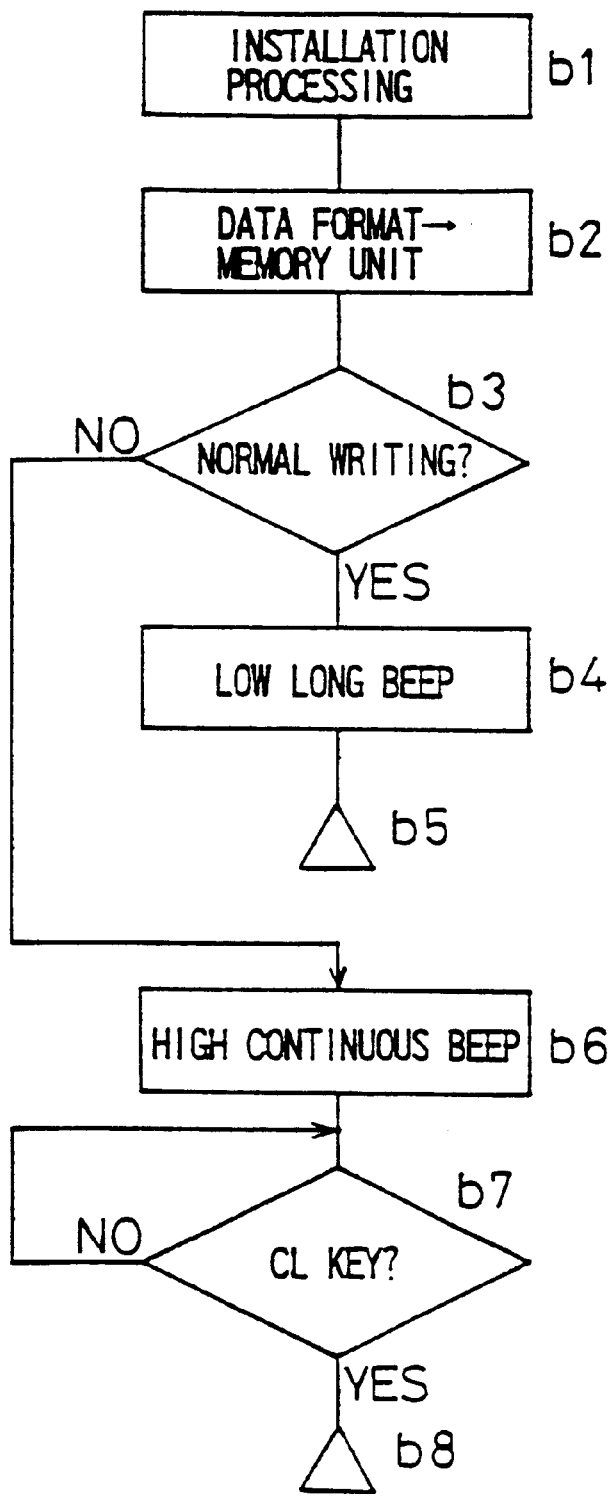
FIG. 13 is a flowchart showing the procedure of a processing performed by the sales processor of FIG. 1.

FIG. 13 shows the procedure of the installation processing. The installation processing is started at step b1. At step b2, the data format 23 on which sales data writing into the memory unit 12 is based is written into the memory unit 12. At step b3, whether writing was normally performed or not is determined based on the data transferred from the memory unit 12. When writing was normally performed, a low long beep is generated at step b4 to notify the operator that writing was normally performed, and the processing is finished at step b5. When it is determined at step b3 that writing was not normally performed, a high continuous beep is generated at step b6 to provide notification that writing was not normally performed. At step b7, the process waits until the [CL] key 94 is operated. When the [CL] key 94 is operated, the high continuous beep is stopped, and the processing is finished at step b8.

Figure 14:
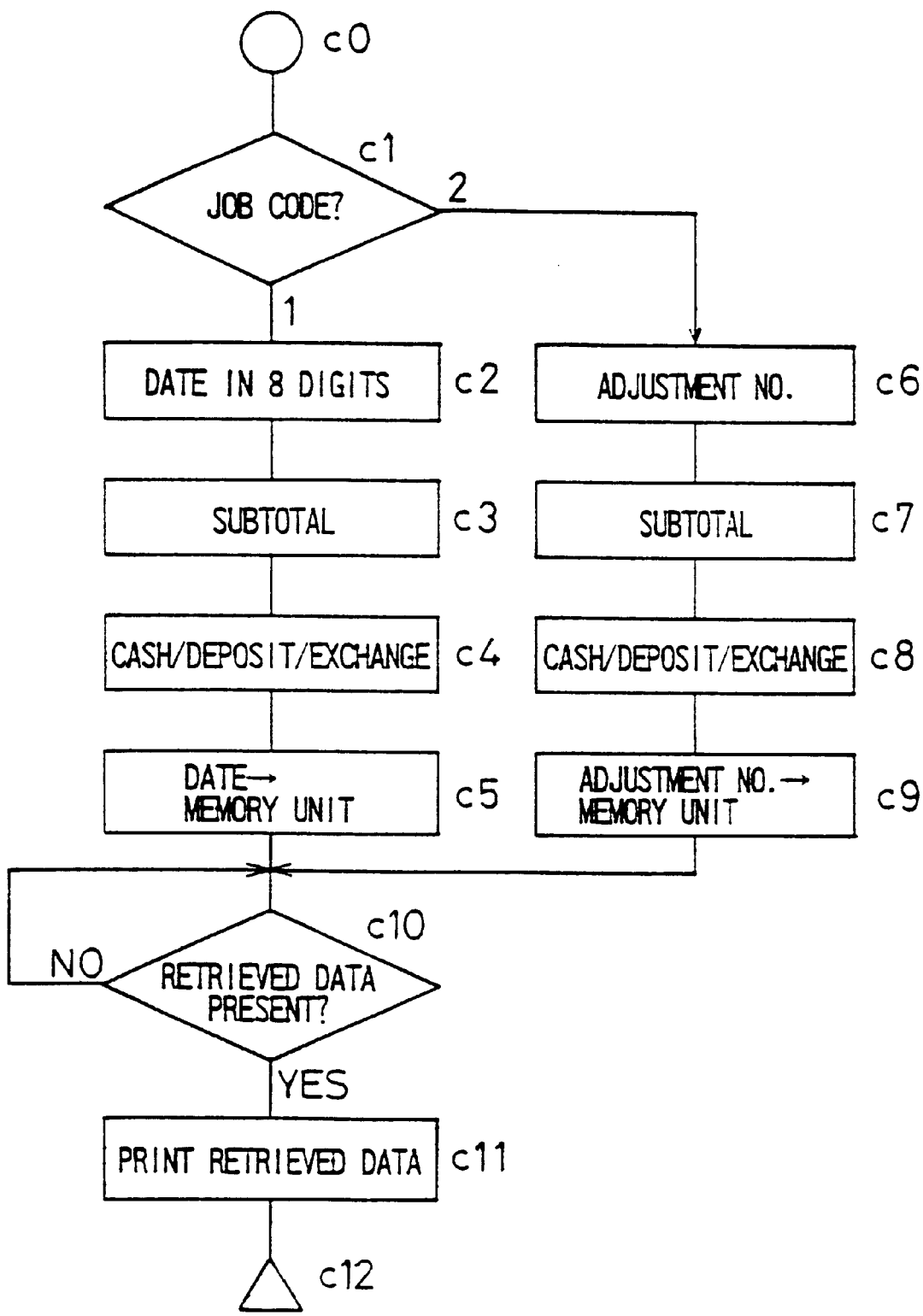
FIG. 14 is a flowchart showing the procedure of a processing performed by the sales processor of FIG. 1.

FIG. 14 shows the procedure of the processing to retrieve and print sales data written in the memory unit 12. The processing is started at step c0. At step c1, the retrieving method is determined from a JOB code. The retrieving method include a method based on the date and a method based on the adjustment NO. which correspond to a JOB code 1 and a JOB code 2, respectively.

When retrieval is performed based on a specified date, the JOB code 1 is input, and at step c2, the specified date is input from the numeric keyboard 99, for example, in eight digits. At step c3, the [SUBTOTAL] key 98 is operated to enter the input date. Then, at step c4, the [CASH/DEPOSIT/EXCHANGE] key 91 is operated to execute the retrieval. At step c5, the item No. representative of the date is added and the input date data is transferred to the memory unit 12 to execute the retrieval of the sales data of the specified date.

When retrieval is performed based on a specified adjustment NO., the JOB code 2 is input, and at step c6, the specified adjustment NO. is input from the numeric keyboard 99, for example, in four digits. At step c7, the [SUBTOTAL] key 98 is operated to enter the input adjustment NO. Then, at step c8, the [CASH/DEPOSIT/EXCHANGE] key 91 is operated to execute the retrieval. At step c9, the item No. representative of the adjustment NO. is added and the input adjustment NO. is transferred to the memory unit 12 to execute the retrieval of the sales data of the specified adjustment NO.

When step c5 or step c9 is completed, at step c10, the CPU 1 waits until the retrieved data is transferred from the memory unit 12. When the CPU 1 receives the retrieved data, the retrieved data is printed at step c12, and the processing is finished at step c12. In the memory unit 12 according to the invention, since sales data is written in the first area 21 or 71 in the order of the adjustment processings, retrieval can be performed at high speed.

Figure 15:
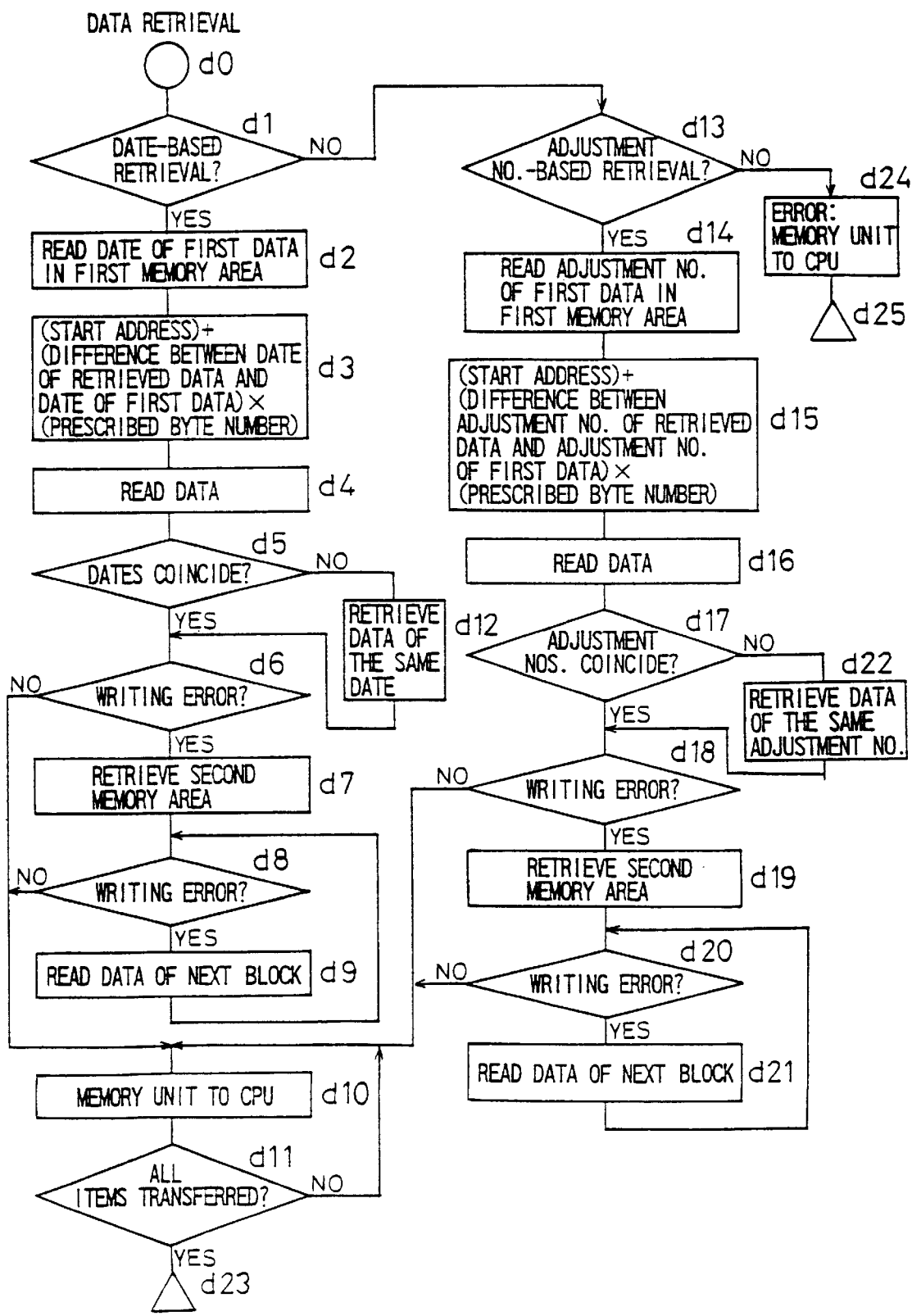
FIG. 15 is a flowchart showing the procedure of a processing performed by the sales processor of FIG. 1.

FIG. 15 shows the procedure of the data retrieving processing performed by the controller 14 of the memory unit 12. When the memory unit 12 receives a retrieval execution instruction from the CPU 1 at step d0, the contents of the instruction are checked, and in order to execute retrieval in accordance with the contents of the instruction, whether the retrieval is the retrieval based on the date or not is determined at step d1. When the retrieval is the retrieval based on the date, at step d2, the date of the data written in the first block of the first area 21 or 71, namely, a data area 21a or 71a is read out. At step d3, in order to identify the storage address of the sales data of the specified date to be retrieved, the byte number of the difference between the date data in the first data area and the specified date which difference is multiplied by a prescribed byte number is added to the start address of the first area to calculate the storage address. At step d4, the data of the calculated address is read out. At step d5, the date of the read data is checked and it is determined whether the date coincides with the specified date or not. When the dates coincide with each other, the writing flag of the read data is checked at step d6. When the error flag area 73 is provided separately from the first area 71, the error flag corresponding to the read data is checked.

When there is a writing error, at step d7, the second area 22 or 72 is retrieved. When data is successively written from the forefront address of the second area 22 or 72 like in the embodiment of FIG. 3 or 7, whether or not the data successively written in the data area from the forefront address is the specified data to be retrieved is determined in units of one block of a prescribed byte number, and the specified data to be retrieved is read out. When data is successively written from the rearmost address of the second area 22 or 72 like in the embodiment of FIG. 4, 5, 8 or 9, whether the data successively written in the data area from the rearmost address is the specified data to be retrieved or not is determined in un its of one block of a prescribed byte number, and the specified data to be retrieved is read out. In the embodiment of FIG. 5, since data writing is continued until writing is normally performed when a error occurs in writing into the second area 22, the data in the data record of the next block is read out at step d9 and error check at step d8 is repeated.

When it is determined at step d6 or step d8 that there is no writing error, the process proceeds to step d10 to transfer the read data to be retrieved to the CPU 1. At step d11, it is determined whether all the items of the read data have been transferred or not. When there are items that have not been transferred, the process returns to step d10 to continue the data transfer. When it is determined at step d5 that the dates do not coincide with each other, at step d12, the preceding and succeeding blocks are retrieved in units of a prescribed byte number based on the difference between the date of the read data and the specified date, and the data of the specified date is read out. Then, the process proceeds to step d6.

When it is determined at step d1 that the retrieval is not the retrieval based on the date, at step d13, it is determined whether the retrieval is the retrieval based on the adjustment NO. or not. When the retrieval is the retrieval based on the adjustment NO., the adjustment NO. of the data written in the data record of the first block of the first area 21 or 71 is read out at step d14. At the next step d15, in order to identify the storage address of the sales data of the specified adjustment NO. to be retrieved, the byte number of the difference between the adjustment NO. of the data in the first data area and the specified adjustment NO. which difference is multiplied by the prescribed byte number is added to the start address of the first area to calculate the storage address. At step d16, the data of the calculated address is read out. At step d17, the adjustment NO. of the read data is checked and it is determined whether the adjustment NO. coincides with the specified adjustment NO. or not. When the adjustment NOs. coincide with each other, the writing flag of the read data is checked at step d18. When the error flag area 73 is provided separately from the first area 71, the error flag corresponding to the read data is checked.

When there is a writing error, processing similar to that of steps d7 to d9 is performed at steps d19 to d21. When it is determined at step d18 or d20 that there is no writing error, the process proceeds to step d10. When it is determined at step d17 that the adjustment NOs. do not coincide with each other, at step d22, the preceding and succeeding blocks are retrieved in units of a prescribed byte number based on the difference between the adjustment NO. of the read data and the specified adjustment NO to read out the data of the specified adjustment NO., and then the process proceeds to step d18.

When it is determined at step d11 that all the items have been transferred, the data retrieving processing is finished at step d23. When it is determined at step d13 that the retrieval is not the retrieval based on the adjustment NO., data representing that an error occurs is transferred from the memory unit 12 to the CPU 1 at step d24. Other retrieval modes may be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A semiconductor memory device using a writable nonvolatile semiconductor memory, the semiconductor memory having first and second memory areas each divided into data records on a prescribed byte number basis, and as well a flag area for writing a writing state as a flag, the semiconductor memory device comprising:

writing error detecting means for judging whether data writing is normally carried out or not during writing data;

flag writing means for writing a writing state as a flag in response to a detection result of the writing error detecting means; and writing switching means for successively writing data to be stored into a data record of the first memory area and when the writing error detecting means detects a writing error, newly writing the data into a data record of the second memory area.

2. The semiconductor memory device of claim 1, further comprising readout switching means for successively reading out data from the data records of the first memory area with reference to the flag area and when a flag representative of a writing error is written, performing switching so that data is read out from the data records of the second memory area.

3. The semiconductor memory device of claim 1, wherein the writing switching means performs writing successively from the forefront address of the second memory area when a writing error is detected.

4. The semiconductor memory device of claim 1, wherein the second memory area is provided in an address area succeeding the first memory area, and the writing switching means successively performs writing from the rearmost address of the second memory area when a writing error is detected.

5. The semiconductor memory device of claim 1, wherein the flag area is provided in each of the data records, and the flag writing means writes the writing state as a flag into the flag area of the data record in which the data is written, every time the writing switching means performs data writing.

6. The semiconductor memory device of claim 1, wherein in the case where any writing error is detected in writing into the second memory area, the writing switching means performs writing into the next data record.

7. A sales processor comprising:

the semiconductor memory device of any one of claims 1 through 6, the data to be stored therein being sales data, the semiconductor memory being an EPROM or a flash memory.

8. The sales processor of claim 7, further comprising:

available memory area detecting means for detecting the presence or absence of a blank area in the second memory area, and available memory area warning means for providing a warning when the available memory area detecting means detects that there is no blank area left in the second memory area.

* * * * *